United States Patent
Balkenhol et al.

(10) Patent No.: US 11,358,190 B2
(45) Date of Patent: Jun. 14, 2022

(54) METHOD FOR PRODUCING A COMPOSITE MATERIAL, AND COMPOSITE MATERIAL

(71) Applicant: Wickeder Westfalenstahl GmbH, Wickede (DE)

(72) Inventors: Michael Balkenhol, Werl (DE); Jens Erlemeyer, Iserlohn (DE)

(73) Assignee: Wickeder Westfalenstahl GmbH, Wickede (DE)

( * ) Notice: Subject to any disclaimer, the term of this patent is extended or adjusted under 35 U.S.C. 154(b) by 189 days.

(21) Appl. No.: 16/348,678

(22) PCT Filed: Oct. 26, 2017

(86) PCT No.: PCT/EP2017/077484
§ 371 (c)(1),
(2) Date: May 9, 2019

(87) PCT Pub. No.: WO2018/091251
PCT Pub. Date: May 24, 2018

(65) Prior Publication Data
US 2019/0321870 A1    Oct. 24, 2019

(30) Foreign Application Priority Data
Nov. 18, 2016  (DE) .................. 10 2016 122 198.8

(51) Int. Cl.
*B21B 1/38*     (2006.01)
*B23K 20/04*    (2006.01)
(Continued)

(52) U.S. Cl.
CPC ............... *B21B 1/38* (2013.01); *B21C 23/00* (2013.01); *B23K 20/04* (2013.01); *B32B 15/012* (2013.01);
(Continued)

(58) Field of Classification Search
CPC ......... B21C 23/00; B21C 23/22; B21C 23/24; B32B 15/012; B32B 15/013; B23K 20/04;
(Continued)

(56) References Cited

U.S. PATENT DOCUMENTS 3,620,880 A    11/1971  Lemelson
2011/0206943 A1*   8/2011  Willis .................... B23K 20/04
428/609

(Continued)

FOREIGN PATENT DOCUMENTS

DE    102013219404 A1    3/2015
EP        2090395 A2     8/2009
(Continued)

OTHER PUBLICATIONS

Engineering ToolBox, (2003). Young's Modulus—Tensile and Yield Strength for common Materials, https://www.engineeringtoolbox.com/young-modulus-d_417.html (Year: 2003).*
(Continued)

*Primary Examiner* — Adam J Eiseman
*Assistant Examiner* — Katie L. Parr
(74) *Attorney, Agent, or Firm* — Edell, Shapiro & Finnan, LLC

(57) ABSTRACT

A method for producing a composite material by plating a band arrangement with a top side (O) and a bottom side (U), wherein the band arrangement comprises at least a first strip and a second strip, which form between them a filling channel, wherein the band arrangement comprises at least one filler strip, wherein the abovementioned band arrangement is plated, wherein a part of the filler strip, during the plating, is extruded into the filling channel; and a composite material, characterized in that it has been produced according to the method as disclosed.

15 Claims, 4 Drawing Sheets

(51) Int. Cl.
  *B32B 15/01* (2006.01)
  *B21C 23/00* (2006.01)
(52) U.S. Cl.
  CPC ...... *B32B 15/013* (2013.01); *B21B 2001/383* (2013.01)
(58) Field of Classification Search
  CPC . B23K 20/0001; B21B 1/38; B21B 2001/383; B21B 2001/386; Y10T 29/302
  USPC ................................. 72/258, 363; 29/17.3
  See application file for complete search history.

(56) References Cited

U.S. PATENT DOCUMENTS

| | | | | |
|---|---|---|---|---|
| 2015/0114698 A1* | 4/2015 | Huang | ............... | H05K 1/115 |
| | | | | 29/17.3 |
| 2016/0059340 A1* | 3/2016 | Hill | ................. | B23K 10/02 |
| | | | | 428/596 |
| 2018/0312979 A1* | 11/2018 | Shinno | ................. | B21B 1/38 |

FOREIGN PATENT DOCUMENTS

| | | | |
|---|---|---|---|
| JP | 61007082 A | 1/1986 | |
| JP | 2008006496 A | 1/2008 | |
| KR | 10-2012-0041925 A | 5/2012 | |
| WO | 2011106074 A1 | 1/2011 | |
| WO | WO-2015043951 A * | 4/2015 | ............ B23K 20/04 |
| WO | 2016160049 A1 | 10/2016 | |

OTHER PUBLICATIONS

International Search report dated Jan. 26, 2018 for corresponding PCT Application No. PCT/EP2017/077484, 4 pages.
Office Action in corresponding German Patent Application No. 10 2016 122 198.8, dated Oct. 6, 2020, with English translation.
Office Action in corresponding Korean Patent Application No. 10-2019-7015879, dated Jun. 18, 2021, with English translation.
Office Action in corresponding Japanese Patent Application No. 2019-526564, dated Jul. 14, 2021, with English translation.

* cited by examiner

METHOD FOR PRODUCING A COMPOSITE MATERIAL, AND COMPOSITE MATERIAL

FIELD OF THE INVENTION

The present invention relates to a method for producing a composite material as disclosed herein, and to a composite material as disclosed herein.

BACKGROUND

A method for producing a composite material by plating has become known, for instance, from PCT/US15/41857. Here, a method for producing a composite material by means of cold rolling, in which different metal strips are joined side by side, is described. A plurality of metal strips are herein brought together on the inlet side, both side by side and one above another, such that the material fed to the roll gap of the roll stand has a continuous rectangular cross section. In addition, the strip widths on the inlet side are chosen such that overlaps are obtained between the strips guided one above another (comparable to the type of bond/ offset used in bricklaying). By the subsequent cold roll plating process, adhesion between the overlapping material surfaces is established, and in this way a composite material which combines different metals side by side, viewed in the direction of rolling, is realized.

Owing to the use of a plurality of strips which are connected, that is to say plated, into a composite material, this method or plating design is also referred to as strip plating.

In the strip plating according to the prior art, the dimensions of the individual strips, in particular with regard to the minimum width, are limited. This applies substantially to all process steps, in particular also to the cutting to size, cleaning and activation of the components.

In those industrial plants which are usually encountered in cold roll (plating) operations, it can be assumed that the width of the metal strips to be treated must be greater than the band thickness (horizontal rectangular profile). Strips having a width below the plate thickness (vertical rectangular profile) cannot generally be treated.

It can further be assumed that the production cost of the strip plating rises significantly with each additional plating partner. Each supplied plating partner must undergo a plurality of process steps up to suitability for plating. In addition, each strip must be fed in a process-reliable manner up to the roll gap (clamping in place, threading) and guided (process operation). In addition to the thus rising process times and ancillary times per strip, the cost also rises with respect to additionally required unwinding stations and guides.

The strip plating also generally has a relatively high number of interfaces, which can adversely affect the composite properties. Interfaces increase the electrical resistance and may reduce the mechanical load-bearing capacity and deformability of the composite material. Typical process defects ("plating defects") usually emanate from the interface. Additional interfaces thus also increase the possibilities or risk of defects.

SUMMARY OF THE INVENTION

Here the present invention sets in and sets itself the task of proposing an improved method for producing a composite material, which method avoids, at least, however, reduces, at least one, preferably all of the drawbacks outlined above.

The method according to the invention is intended to widen the presentable range of widths and, in particular, to enable the creation of very small area widths, which could otherwise not be produced with given industrial plants, or only at considerable expense.

In addition, the method proposed according to the invention is intended to reduce the production cost and thus to be more sparing on resources than known methods for producing similar plating designs. Also the number of homogeneous interfaces is intended to be reduced and hence improved composite properties achieved, and typical interface defects locally avoided.

According to the invention, this object is achieved by a method for producing a composite material by plating a band arrangement, wherein the band arrangement comprises at least a first strip and a second strip, which form between them a filling channel, wherein the band arrangement comprises at least one filler strip, wherein the abovementioned band arrangement is plated, wherein a part of the filler strip, during the plating, is extruded into the filling channel. In other words, the narrow regions in the composite material to be produced are no longer supplied as separate strips. Rather, the resulting narrow region is, or the resulting narrow regions are jointly created during the plating by extrusion into the filling channel out of the filler strip. That part of the filler strip which is extruded into the filling channel accordingly forms to some extent a narrow region, which, however, could not be produced, or only at enormous expense, according to traditional methods. The width of the created region in the filling channel is thus no longer bound to the width requirements of the preliminary units of the plating process. As a result of the lower number of incoming strips, both the production cost and the number of homogenous interfaces in the composite are reduced. The number of homogenous interfaces is in particular reduced by virtue of the fact that between the original filler strip and that part of the filler strip that is extruded into the filling channel forms no interface which at least theoretically would be present if two separate strips were used for this region.

In order to differentiate between the supplied components for the plating process and the plated composite material, reference shall be made to strips supplied to the plating process and, in the case of the composite material, regions. The regions are, so to speak, the plated strips.

Further advantageous embodiments of the proposed invention emerge, in particular, from the features disclosed herein. The subjects and features, respectively, of the various embodiments can in principle be mutually combined as desired.

In an advantageous embodiment of the invention, it can be provided that the filler strip is disposed above the filling channel, and the filler strip has a greater width than the filling channel. It can hereby be ensured that the filler strip provides enough material above the filling channel, and the strips or the filling channels disposed between the strips can serve as dies for the extrusion process.

In a further advantageous embodiment of the invention, it can be provided that the band arrangement comprises more than two strips and/or more than one filler strip, wherein the strips form between them filling channels. The principle of that part of a filler strip that is extrudable or extruded into the filling channel is naturally able to be transferred to a plurality of filling channels arranged side by side, which are correspondingly formed by strips, between them. The next "expansion stage" would be, for instance, three strips, which correspondingly form between them two filling channels. It is also of course conceivable that the band arrangement comprises more than two filler strips. Same or different materials for strips or filler strips are conceivable.

In a further advantageous embodiment of the invention, it can be provided that the filler strip or filler strips have a lesser strength, in particular tensile strength (Rm), than the strips, preferably a strength difference of at least 50 N/mm², prior to the plating. The strips act like a die for the filler strip. In order to ensure that the filler strip extrudes into the filling channel, and not the strips, it may be advisable to maintain the above-outlined difference in respect of the tensile strengths, wherein a difference of at least 50 N/mm² has proved successful in trials.

In a further advantageous embodiment of the invention, it can be provided that the filler strip or filler strips of the band arrangement have a tensile strength (Rm) prior to the plating of less than 300 N/mm², and/or that the strips have a tensile strength (Rm) of at least 200 N/mm² prior to the plating. These values too have proved successful in series of trials and generally lead to a satisfactory composite material which has the advantages or properties outlined above.

In a further advantageous embodiment of the invention, it can be provided that, as the material for the strip or strips, iron and nonferrous metals, as well as their alloys, in particular steel, special steel and nonferrous heavy metals, can be considered, and/or, for the filler strip or filler strips, iron and nonferrous metals, in particular steel, special steel, nonferrous heavy metals, precious metals, aluminum, as well as their alloys, can be considered.

In a further advantageous embodiment of the invention, it can be provided that one side of the band arrangement, preferably the bottom side of the band arrangement, is formed by the strips and the filling channel or filling channels. Prior to the plating, the band arrangement accordingly, as a result of the interruptions of the filling channel, forms no continuously rectangular cross section.

In a further advantageous embodiment of the invention, it can be provided that one side of the band arrangement, preferably the top side of the band arrangement, is formed completely by the filler strip or filler strips. This embodiment may be advisable on grounds of production-engineering benefits, since a filler strip of this type or a resulting band arrangement can be effectively guided by appropriate guides into the roll gap.

Alternatively, it can also be provided that one side of the band arrangement, preferably the top side of the band arrangement, is formed only in some sections by the filler strip or filler strips, in particular that the top side is formed by the strips and the filler strip or filler strips. In order to save material, an appropriate filling material may therefore be reserved for extrusion just in in some sections.

In this context, it can preferably be provided that the strips have, in the region of at least one filling channel, recesses for receiving a part of the filler strip, wherein it is in particular provided that the filler strip projects from the plane formed by the strips on the top side. By virtue of the recesses, which run preferably in the longitudinal direction of the band arrangement, two positive effects can be achieved. On the one hand, a certain transverse stability or guidance of the filler strip upon entry into the roll gap is achieved. On the other hand, somewhat more material can here be provided for the extrusion operation. Yet more material can be provided for the extrusion process if the filler strip projects from the plane formed by the strips on the top side.

In a further advantageous embodiment of the invention, it can be provided that the strips have, in the region of at least one filling channel, recesses for receiving a part of the filler strip, wherein it is in particular provided that the filler strip does not project from the plane formed by the strips on the top side. The benefit lies in the material savings. In addition, an easier guidance of the incoming strips into the roll plating device is possible.

In a further advantageous embodiment of the invention, it can be provided that at least one of strips is formed of two or more individual strips. In principle, a recess for receiving the filler strip can be milled into a monolithic strip, or can be made by other reworking measures. Another and possibly cost-effective option for the design of the recess or of the filling channel is constituted by the connection, for instance by plating, of two strips of different width. The recess in the longitudinal direction of the created strip is then obtained to some extent automatically.

A further object of the present invention consists in proposing an improved composite material, in particular a composite material which has very small area widths and/or a small number of homogenous interfaces.

According to the invention, this object is achieved by a composite material as disclosed herein, which is distinguished by the fact that it has been produced according to the method as disclosed herein. A composite material produced in this way can have very small area widths. A small number of homogeneous interfaces derives substantially from the fact that, for instance, no interface exists between the original filler strip and that part of the filler strip that is extruded into the filling channel.

Further advantageous embodiments of the proposed invention emerge in particular from the features of the disclosure. The subjects and features, respectively, of the various embodiments can in principle be mutually combined as desired.

In an advantageous embodiment of the invention, it can be provided that the composite material has a rectangular or approximately rectangular cross section. Such a shape is advantageously suitable for further treatment, for instance, as a semifinished product or else as a finished product.

In a further advantageous embodiment of the invention, it can be provided that the filling channel or filling channels are completely filled with an extruded part of the filler strip or filler strips. This produces a substantially flat surface, instead of the original filling channel.

In a further advantageous embodiment of the invention, it can be provided that the filling channel or filling channels are only partially filled with an extruded part of the filler strip or filler strips. The benefit lies in the material savings.

BRIEF DESCRIPTION OF THE DRAWINGS

Further features and advantages of the present invention become clear from the following description of preferred illustrative embodiments with reference to the accompanying figures, in which.

DETAILED DESCRIPTION OF THE INVENTION

Figure 1:
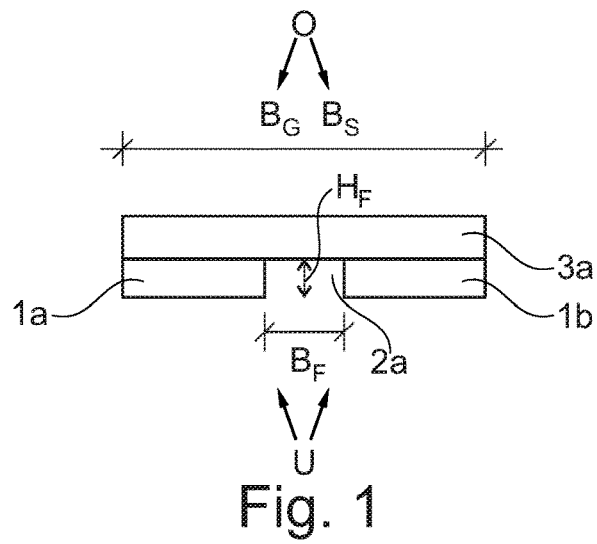
FIG. 1 shows a cross-sectional representation of a band arrangement.
Figure 2:
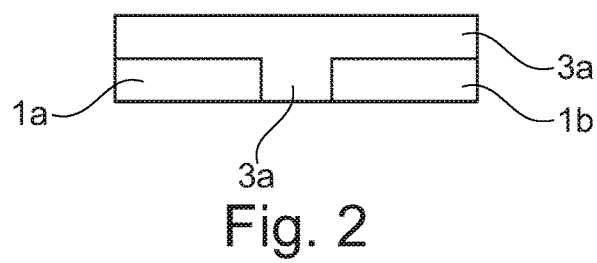
FIG. 2 shows a cross-sectional representation of a composite profile produced from the band arrangement according to FIG. 1.

The proportions in the figures do not necessarily correspond to the real proportions, but serve substantially for illustrative purposes.

The following reference symbols are used in the figures:
L longitudinal axis
$B_G$ total width
$B_F$ width of the filling channel
$H_F$ height of the filling channel
$B_S$ width of the filler strip
A recess
top side
U bottom side
1a (first) strip
1b (second) strip
1c (third) strip
1d (fourth) strip
2a filling channel
2b (second) filling channel
2c (third) filling channel
3a filler strip
3b (second) filler strip In the method proposed according to the invention, a band arrangement is fed to a roll plating device (not represented) or to the inlet of a roll plating device and leaves the roll plating device or the outlet as a plated composite material. A preferred plating method for the present invention is constituted by the roll plating. In principle, other plating methods are, however, also conceivable.

Figure 5:
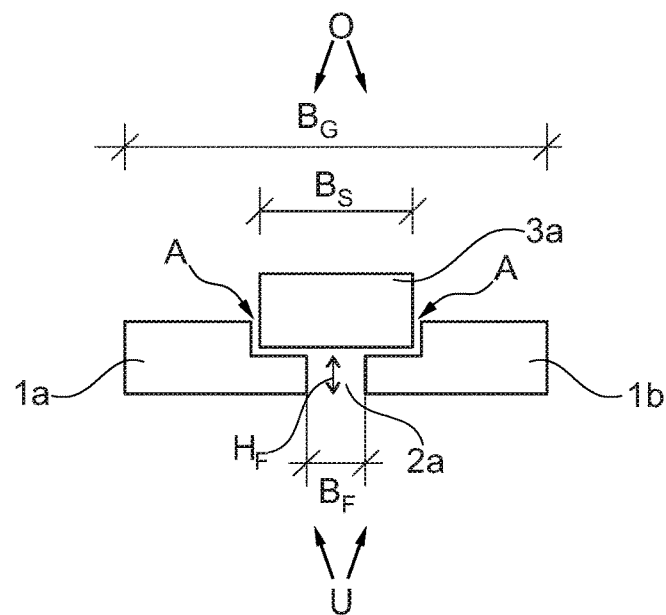
FIG. 5 shows a cross-sectional representation of a further band arrangement.
Figure 6:
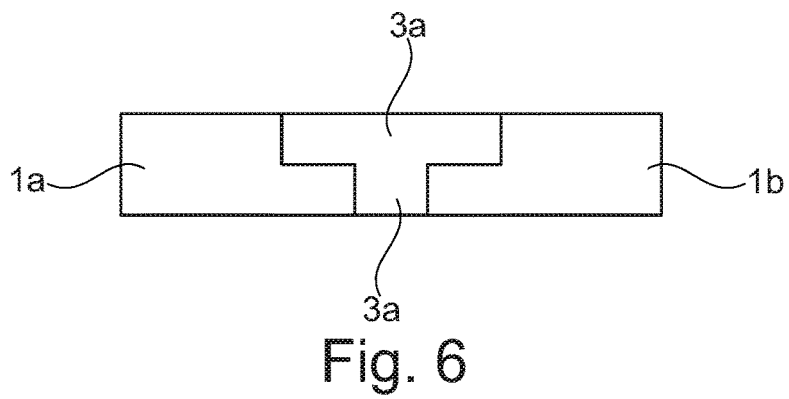
FIG. 6 shows a cross-sectional representation of a composite profile produced from the band arrangement according to FIG. 5.

The band arrangement comprises at least a first strip 1a and a second strip 1b, wherein the first strip and the second strip form between them a filling channel 2a. The filling channel 2a can be configured, for instance, by an appropriate spacing of the strips. The filling channel can, however, also be configured in the strips by spacing of the strips and/or by an appropriate recess, preferably a recess of rectangular cross section, as represented, for instance, in FIG. 5.

Figure 15:
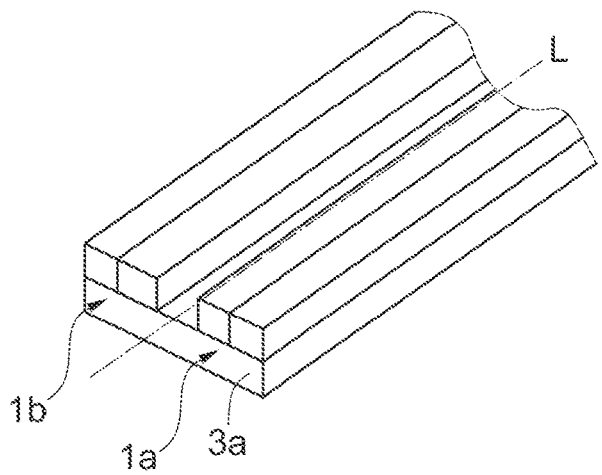
FIG. 15 is a perspective view of the bottom side of the band arrangement of FIG. 1 showing the first strip and the second strip composed of at least two individual strips in accordance with certain aspects of the present invention.

As shown in FIG. 15, the strips per se can also be composed of at least two individual strips or a plurality of strips, preferably of individual strips of different width, so that the respective part of the filling channel emerges from the difference in width of the filler strips. The individual strips can already beforehand have been connected, in particular plated, into a strip, but can also be connected to one another during the below-described plating operations with extrusion of the filler strip or filler strips. This measure can preferably be considered instead of making a recess in a monolithic strip.

The filling channel can also be referred to as a groove. The filling channel runs in the longitudinal direction L of the band arrangement. The strips here preferably respectively form a part of the filling channel.

In addition, the band arrangement comprises at least one filler strip 3a. The filler strip 3a is disposed above the filling channel 2a and has a greater width $B_S$ than the filling channel 2a. The filler strip 3a is in particular designed such that it would not fit into the filling channel 2a during the band arrangement stage. The band arrangement entering into the roll gap thus has no continuously rectangular cross section.

As the preferred width $B_F$ of the filling channel, an order of magnitude of 0.5 mm to 10 mm can be quoted.

As the preferred height $H_F$ of the filling channel, an order of magnitude of 0.5 mm to 4.5 mm can be quoted.

The filler strip 3a preferably has a lesser strength, in particular tensile strength (Rm), than the first strip 1a and the second strip 1b. The filler strip 3a should herein on the inlet side not exceed a tensile strength (Rm) of 300 N/mm². The first strip 1a and the second strip 1b, which ultimately act like a die for the filler strip 3a, should moreover have a tensile strength (Rm) of at least 200 N/mm² prior to the plating. In the design of the band arrangement, a strength difference of min. 50 N/mm² between the strips and the filler strip or filler strips should preferably be sought. The quoted values relate to values prior to the plating.

As the material for the strips, iron and nonferrous metals, as well as their alloys, in particular steel, special steel and nonferrous heavy metals, can be considered.

As the material for the filler strip or filler strips, iron and nonferrous metals, in particular steel, special steel, nonferrous heavy metals, precious metals, aluminum and their alloys, can be considered.

The forming of the band arrangement into the composite material shall be described in greater detail below.

The band arrangement or the individual strips or individual strips of the band arrangement can be unwound, for instance, from rolls and brought together, via suitable guides, to form the envisioned cross section of the band arrangement. Here, a guide having an opening which broadly corresponds to the cross section of the band arrangement can, for instance, be employed. A pin which runs in the filling channel and holds the strips appropriately at a distance apart or in position can, for instance, be provided. The guide can crucially help to ensure that the filling channel 2a is formed between the strips.

The softer plating partner, that is to say the filler strip, is fed to the roll gap preferably only monolithically.

In a simple embodiment of the band arrangement, as represented, for instance, in FIG. 1, the filler strip covers the band arrangement over the entire width $B_G$, in particular, however, the filler strip 3a covers the filling channel 2a. In this respect, the top side of the band arrangement be completely formed by the filler strip 3a, while the bottom side are formed by the first strip 1a and the second strip 1b, interrupted by the filling channel 2a. As a result, a band arrangement is obtained, wherein the filling channel 2a is initially still recessed.

During the plating—as in a standard plating process—the plating partners, in particular the filler strip 3a, are connected to the first strip 1a and the second strip 1b. As is customary in plating, a basically non-releasable connection is formed between the plating partners.

During the plating, however, an extrusion of a part of the filler strip 3a into the filling channel 2a likewise takes place. The firmer plating partner, that is to say the strips 1, herein acts as a die for the basically softer plating partner, that is to say the filler strip or filler strips. Because of the function of the strips, the strips 1 can also be referred to as die strips.

On the outlet side, a composite material which combines different metals side by side, viewed in the direction of rolling, and the transverse profile of which is approximately rectangular, preferably rectangular, is formed. Preferably, that part of the filler strip 3a that is extruded into the filling channel 2a completely fills the filling channel 2a. The bottom side of the composite material is correspondingly formed by the first strip 1a, the second strip 1b and the filler strip 3a extruded into the filling channel 2a. In this embodiment, the top side of the composite material is preferably still completely formed by the filler strip 3a.

In cross section, those regions in the resulting composite material which emerge from the strips and the filler strip or filler strips are clearly discernible.

Figure 3:
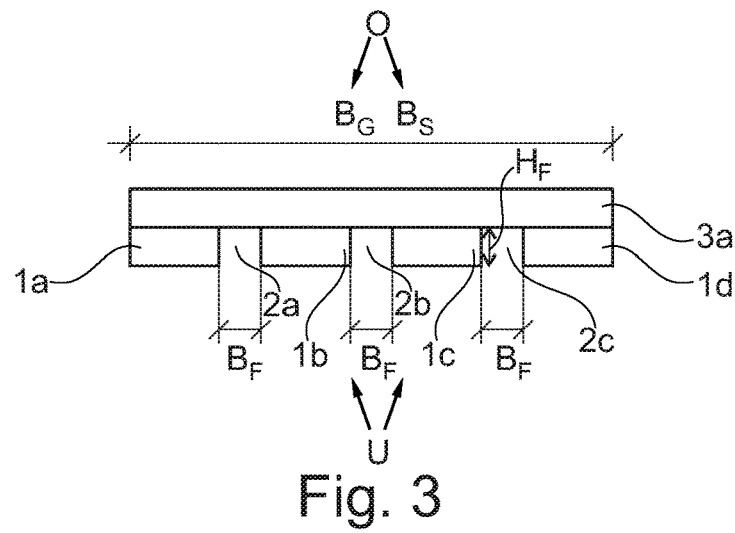
FIG. 3 shows a cross-sectional representation of another band arrangement.

In principle, the band arrangement can also contain more than two strips. In FIG. 3 is represented, for instance, a band arrangement which is formed of four strips and a filler strip, in particular a first strip 1a, a second strip 1b, a third strip 1c, a fourth strip 1d, and a filler strip 3a. In this respect, the first strip 1a and the second strip 1b form between them a first filling channel 2a, the second strip 1b and the third strip 1c form between them a second filling channel 2b, etc. In the present case too, the filler strip 3a covers the strips 1a to 1d over their entire width $B_G$. The filling channels 2a, 2b, 2c can, but do not all have to have the same width $B_F$.

Figure 4:
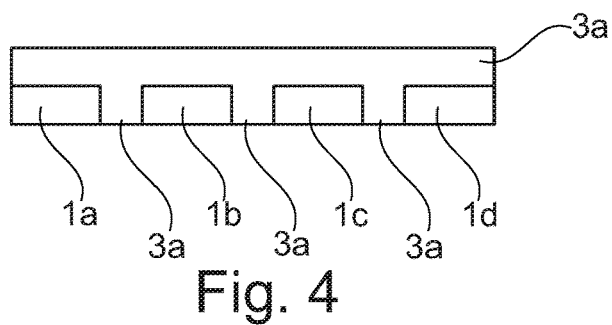
FIG. 4 shows a cross-sectional representation of a composite profile produced from the band arrangement according to FIG. 3.

Such a band arrangement, too, can be plated in a plating device, preferably a band plating device. The strips 1a to 1d are connected to the filler strip 3a, the filler strip 3a extruded partially into the filling channels 2a to 2c. As a result, a composite material as represented in FIG. 4 is obtained. The top side is formed completely by the filler strip 3a, the bottom side alternately by the strips and the filler strip extruded into the filling channels.

In a further variant of the production process according to the invention, a part of the filler strip 3a can also be accommodated in recesses A of the strips 1a, 1b, which are disposed in the mutually adjacent strips. It can further be provided that the filler strip 3a protrudes over the plane formed out of the strips. Such a band arrangement is represented in cross section in FIG. 5. It can be seen that the resulting cross section of the band arrangement is not rectangular. Rather, the top side of the band arrangement is of stepped configuration. Nevertheless, the filling channel 2a is disposed between the strips 1a, 1b and is covered by the filler strip 3a. However—in contrast to the previously described variants—not the entire top side of the band arrangement is formed by the filler strip 3a. Rather, the top side is correspondingly formed by the strips 1a, 1b and the filler strip 3a. The bottom side is here too formed by the strips 1a, 1b, which correspondingly form between them a filling channel 2a.

As already outlined above, the band arrangement is fed to a plating device and appropriately plated. The filler strip 3a is extruded partially into the filling channel 2a. The filler strip can here be of more voluminous design and can provide correspondingly more material for the extrusion process, in particular since it can be embedded a little via the recesses. Equally, the recesses form an additional guide for the entry of the band arrangement into the roll plating device. Insofar as the filler strip is elevated, so to speak, over the plane of the strips, yet more material can here be provided for the extrusion process. Filler strips should, however, preferably be used or oriented such that they have a greater width than height when they are inserted in the filling channel or filling channels.

Figure 7:
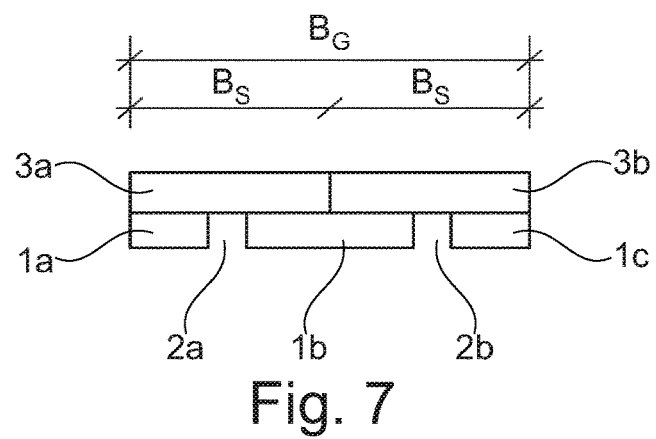
FIG. 7 shows a cross-sectional representation of an additional band arrangement.
Figure 8:
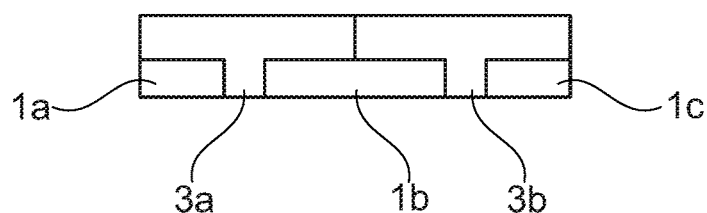
FIG. 8 shows a cross-sectional representation of a composite profile produced from the band arrangement according to FIG. 7.

There can also be provided more than one filler strip, for instance a first filler strip 3a and a second filler strip 3b. Such a variant is represented in FIG. 7 (band arrangement) and FIG. 8 (composite material). The filler strips here form the entire top side of the band arrangement.

Figure 9:
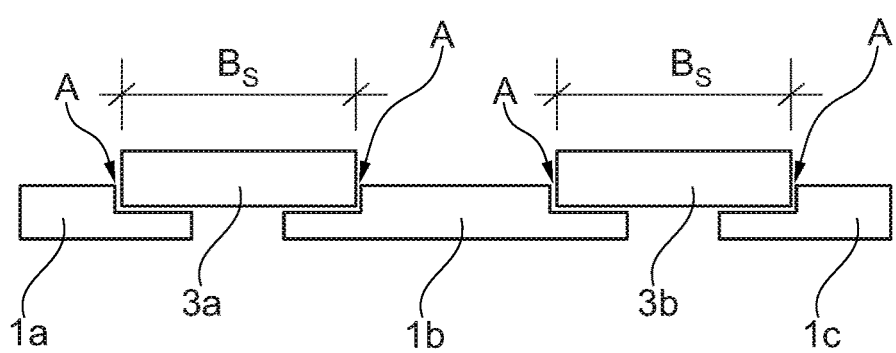
FIG. 9 shows a cross-sectional representation of yet another band arrangement.
Figure 10:
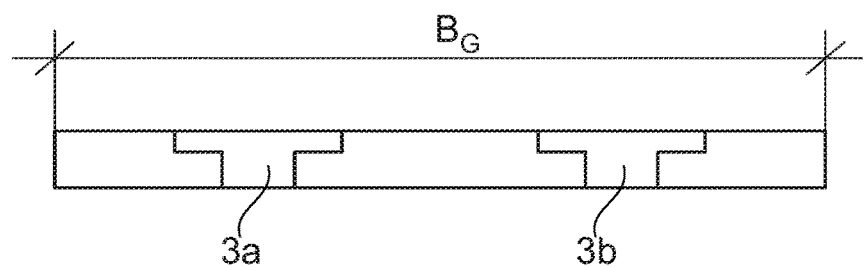
FIG. 10 shows a cross-sectional representation of a composite profile produced from the band arrangement according to FIG. 9.
Figure 11:
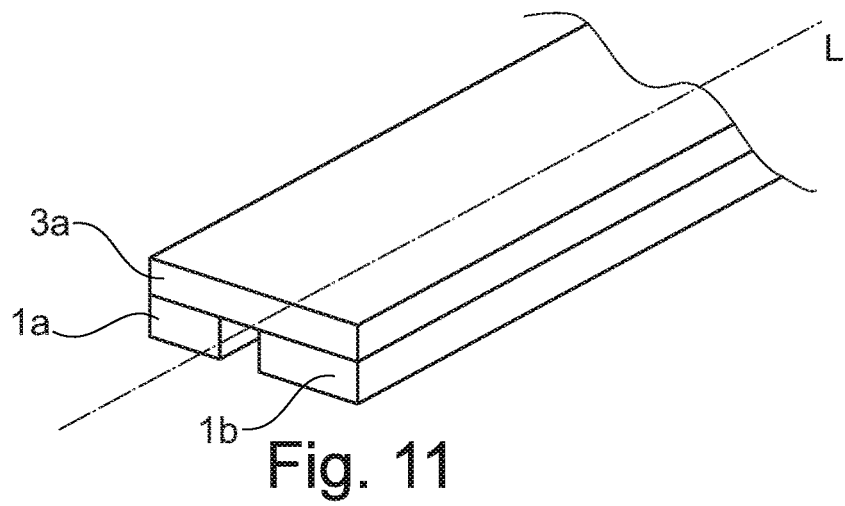
FIG. 11 shows a band arrangement according to FIG. 1 in a perspective view onto the top side.
Figure 12:
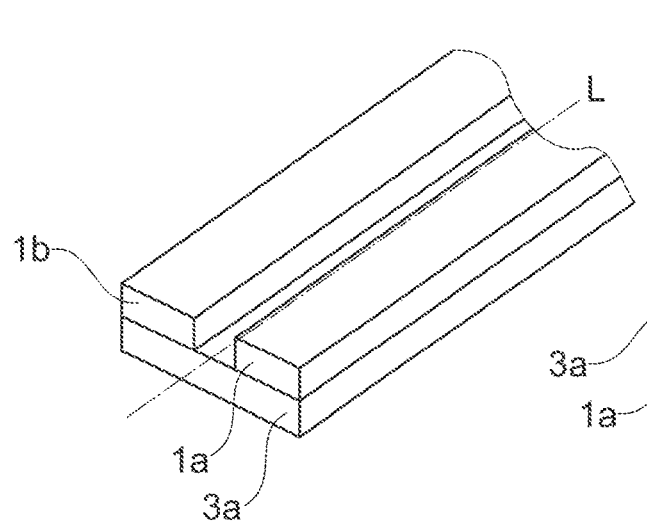
FIG. 12 shows a band arrangement according to FIG. 1 in a perspective view onto the bottom side.
Figure 13:
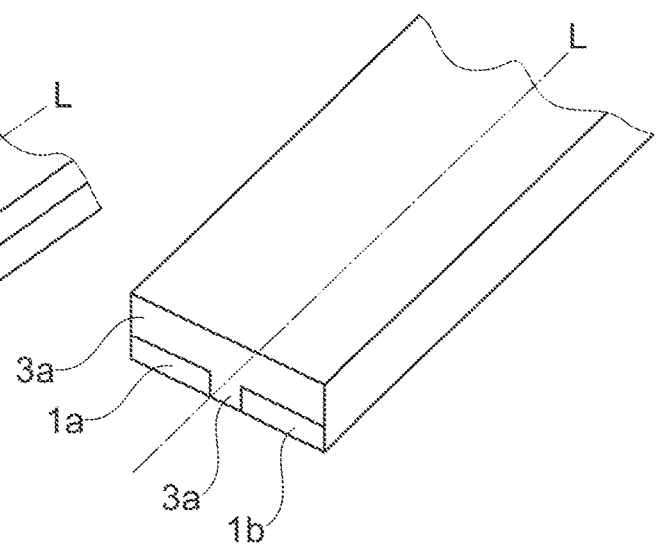
FIG. 13 shows a composite material produced from the band arrangement according to FIG. 1 or FIGS. 11 and 12 in a perspective view onto the top side.
Figure 14:
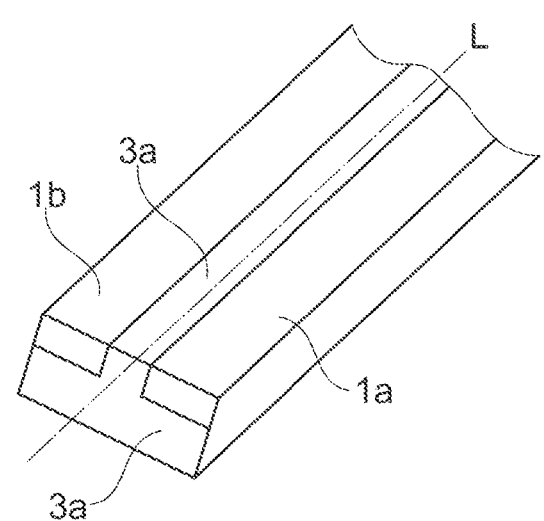
FIG. 14 shows a composite material produced from the band arrangement according to FIG. 1 or FIGS. 11 and 12 in a perspective view onto the bottom side.

A variant according to FIG. 9 and FIG. 10 is also conceivable. Here, it is provided for the band arrangement, for instance, that the top side O of the band arrangement is formed only in some sections by the filler strips 3a, 3b. It is also provided that the strips 1a, 1b, 1c have, in the region of the respective filling channel 2a, 2b, recesses A for receiving the respective filler strip 3a, 3b. The filler strips 3a, 3b are here also of elevated configuration.

The abovementioned variants are not exhaustive. It is in particular conceivable that the band arrangement is formed of more than two strips and/or more than one filler strip, correspondingly has one or more filling channels. The surface of the band arrangement can be wholly or partially formed the filler strip or filler strips. Insofar as the surface of the band arrangement is partially formed by the filler strip or filler strips, recesses in the region of the filling channels can preferably be considered, wherein in particular the filler strip projects from the plane formed by the strips on the top side.

As a result, in all cases a composite material is obtained in the form of a strip plating, which can be produced extremely rationally, in particular comparatively narrow portions, in the form of the filler strips extruded into the filling channels, can be created, which filler strips appear, for instance, on the bottom side of the composite material as very narrow portions.

What is claimed is:

1. A method for producing a composite material, the method comprising:
   supplying a band arrangement to be plated, the band arrangement comprising:
      a top side (O) and a bottom side (U),
      at least a first strip and a second strip, wherein the first and/or the second strip, respectively, is/are composed of two or more independent and discrete strips,
      at least one filler strip, and
      a filling channel formed between the at least first and second strips;
   plating the band arrangement; and
   extruding, during the plating, a part of the filler strip into the filling channel.

2. The method of claim 1, wherein the filler strip is disposed above the filling channel.

3. The method of claim 1, wherein the filler strip has a greater width ($B_S$) than the filling channel ($B_F$).

4. The method of claim 1, wherein the band arrangement comprises more than two strips and/or more than one filler strip, wherein the strips form between them filling channels.

5. The method of claim 1, wherein the filler strip or filler strips of the band arrangement have a lesser strength than the strips of the band arrangement prior to the plating.

6. The method of claim 1, wherein the filler strip or filler strips of the band arrangement do not exceed a tensile strength (Rm) of 300 N/mm$^2$ prior to the plating.

7. The method of claim 1, wherein the first and the second strip of the band arrangement have a tensile strength prior to the plating (Rm) of at least 200 N/mm$^2$.

8. The method of claim 1, wherein the material for the first and/or the second strip is selected from iron and nonferrous metals and their alloys, and/or the material for the filler strip or filler strips is selected from iron and nonferrous metals.

9. The method of claim 1, wherein the bottom side (U) of the band arrangement is formed by the strips and the filling channel or filling channels.

10. The method of claim 1, wherein the top side (O) of the band arrangement is formed completely by the filler strip or filler strips.

11. The method of claim 1, wherein the top side (O) of the band arrangement is formed only in some sections by the filler strip or filler strips.

12. The method of claim 1, wherein the first and the second strip have, in the region of at least one filling channel, recesses (A) for receiving a part of the filler strip, wherein the filler strip projects from the plane formed by the first and the second strip on the top side.

13. The method of claim 1, wherein the first and the second strip have, in the region of at least one filling channel, recesses (A) for receiving a part of the filler strip, wherein the filler strip does not project from the plane formed by the first and the second strip on the top side.

14. The method of claim 5, wherein the strength difference is at least 50 N/mm$^2$ tensile strength (Rm).

15. The method of claim 8, wherein the material for the first and/or the second strip is selected from steel, special steel and nonferrous heavy metals, and/or the material for the filler strip or filler strips is selected from steel, special steel, nonferrous metals, precious metals, aluminum and their alloys.

* * * * *